United States Patent
Sacripante (10) Patent No.: US 8,829,149 B2
(45) Date of Patent: Sep. 9, 2014

(54) METHODS FOR RECYCLING BYPRODUCT OF POLYESTER RESIN PRODUCTION

(75) Inventor: Guerino G. Sacripante, Oakville (CA)

(73) Assignee: Xerox Corporation, Norwalk, CT (US)

( * ) Notice: Subject to any disclaimer, the term of this patent is extended or adjusted under 35 U.S.C. 154(b) by 35 days.

(21) Appl. No.: 13/612,149

(22) Filed: Sep. 12, 2012

(65) Prior Publication Data

US 2014/0072912 A1 Mar. 13, 2014

(51) Int. Cl.
*C08G 64/00* (2006.01)
*C08G 63/02* (2006.01)

(52) U.S. Cl.
USPC .............. 528/196; 430/109.4; 430/137.14; 528/193; 528/271; 528/272; 528/273

(58) Field of Classification Search
USPC .......... 430/109.4, 137.14; 528/192, 193, 271, 528/272, 273, 274
See application file for complete search history.

(56) References Cited

U.S. PATENT DOCUMENTS

| 6,127,080 | A  | * | 10/2000 | Sacripante et al. | ........ 430/109.4 |
| 6,180,747 | B1 | * | 1/2001  | Sacripante et al. | ........... 528/193 |
| 6,291,122 | B1 | * | 9/2001  | Sacripante et al. | ........ 430/109.4 |
| 8,257,899 | B2 | * | 9/2012  | Sacripante        | ............... 430/137.14 |
| 8,466,254 | B2 | * | 6/2013  | Sacripante        | .................... 528/274 |

* cited by examiner

*Primary Examiner* — Terressa Boykin
(74) *Attorney, Agent, or Firm* — MH2 Technology Law Group LLP (57) ABSTRACT

Processes for preparing polyester resins as toner production components. The processes include reacting an organic diol and a cyclic alkylene carbonate to produce carbon dioxide ($CO_2$) and a polyalkoxy diol. The carbon dioxide is reacted with an alkylene glycol or alkylene oxide to produce additional cyclic alkylene carbonate having the same chemical structure as the cyclic alkylene carbonate used to produce the polyalkoxy diol. The additional cyclic alkylene carbonate is added with the cyclic alkylene carbonate used to produce the polyalkoxy diol. The polyalkoxy diol can be reacted with an organic diacid or diester in preparing a polyester resin. To prepare a toner, the polyester resin can be contacted with at least one toner production component.

20 Claims, 3 Drawing Sheets

METHODS FOR RECYCLING BYPRODUCT OF POLYESTER RESIN PRODUCTION

BACKGROUND

Embodiments herein relate to processes for preparing a polyester resin as a toner production component and processes for preparing a toner composition that include preparing a polyester resin. Some embodiments are drawn to processes for producing a toner production component or a toner composition, including recycling a carbon dioxide byproduct.

Polyester and unsaturated polyester resins can be prepared by a polycondensation process involving the reaction of a diol and a diacid or diester. Unsaturated polyester resins can be prepared using an unsaturated diacid containing an alkene segment, such as fumaric or maleic acid or diesters thereof.

Commercially available electrophotographic toners can comprise a resin, such as a polyester, a pigment and optionally a charge control agent. Many different toner formulations are known. Some toner formulations that provide desirable low fixing temperatures and offset properties comprise a crosslinked unsaturated polyester resin. U.S. Pat. No. 5,227,460 discloses examples of such toner formulations and its disclosure is incorporated herein by reference in its entirety.

Unsaturated polyester resins can be obtained by a condensation method of alkoxylation that can include the reaction of a diol with a cyclic alkylene carbonate. In a specific example, bisphenol A can be condensed with a cyclic propylene carbonate in the presence of a catalyst, thereby releasing carbon dioxide as a byproduct and producing a mixture of propoxylated bisphenol A. The source of the carbon dioxide is the propylene carbonate (cyclic alkylene carbonate).

Because toners are used in such great quantities worldwide, recycling the $CO_2$ produced as a byproduct of preparing polyester resins used in the toners may reduce the amount of $CO_2$ released into the environment. The carbon dioxide can be sequestered or collected for recycling. However, it is very costly to liquefy/solidify and re-transport $CO_2$. There is a need to minimize the amount of carbon dioxide generated and released to the atmosphere. There is also a need to lower the cost of resin processes involved in the production of polyesters, such as unsaturated polyesters used in the production of toners.

SUMMARY

Certain embodiments are drawn to processes for preparing a polyester resin as a toner production component. The processes comprise reacting an organic diol and a first cyclic alkylene carbonate in a first reaction mixture, thereby producing carbon dioxide ($CO_2$) and a polyalkoxy diol; reacting the $CO_2$ with an alkylene glycol or alkylene oxide in a second reaction mixture, thereby producing a second cyclic alkylene carbonate; and adding the second cyclic alkylene carbonate to the first cyclic alkylene carbonate and/or the first reaction mixture. The first cyclic alkylene carbonate and the second alkylene carbonate can have the same chemical structure, in certain embodiments.

Some embodiments are drawn to processes for preparing a toner composition comprising: preparing a polyester resin and contacting the polyester resin with at least one toner production component. The polyester resin can be prepared by processes comprising reacting an organic diol and a first cyclic alkylene carbonate in a first reaction mixture, thereby producing carbon dioxide ($CO_2$) and a polyalkoxy diol; reacting the $CO_2$ with an alkylene glycol or alkylene oxide in a second reaction mixture, thereby producing a second cyclic alkylene carbonate; adding the second cyclic alkylene carbonate to the first cyclic alkylene carbonate and/or first reaction mixture; and reacting the polyalkoxy diol with an organic diacid or diester. The first cyclic alkylene carbonate and the second alkylene carbonate can have the same chemical structure.

Certain embodiments are drawn to processes for recycling carbon dioxide. The processes comprise reacting an organic diol and a first cyclic alkylene carbonate in a first reaction mixture, thereby producing carbon dioxide ($CO_2$) and a polyalkoxy diol; reacting the $CO_2$ with an alkylene glycol or alkylene oxide in a second reaction mixture, thereby producing a second cyclic alkylene carbonate; and adding the second cyclic alkylene carbonate to the first cyclic alkylene carbonate and/or the first reaction mixture. The first cyclic alkylene carbonate and the second alkylene carbonate can have the same chemical structure, in certain embodiments.

DETAILED DESCRIPTION

Processes for Preparing a Polyester Resin

Certain embodiments are drawn to processes for preparing a saturated polyester resin or an unsaturated polyester resin as a toner production component. Such processes can comprise reacting an organic diol and a first cyclic alkylene carbonate in a first reaction mixture, thereby producing carbon dioxide ($CO_2$) and a polyalkoxy diol An alkylene carbonate can be reacted with an organic diol (i.e., bisphenol A) and the resulting product can then be reacted with an unsaturated monomer (such as, fumaric acid) to produce an unsaturated polyester, or reacted with a saturated diacid (such as, terephthalic acid) to produce a saturated polyester resin.

In certain embodiments, the organic diol can be an aromatic hydroxyl or a difunctional phenolic, such as Bisphenol-A, which when reacted with an alkylene carbonate produces a polyalkoxy diol and carbon dioxide. The polyalkoxy diol can then be reacted with a diacid or diester to produce a polyester resin. An exemplary reaction for production of a polyester resin using a first cyclic alkylene carbonate is shown below.

Bisphenol A

-continued

R = H, CH₃

In some embodiments, the R group in the structure above can be H (using ethylene carbonate) or CH₃ (using propylene carbonate) and the reaction product can be reacted with other diols as mixtures (such as a mixture of propanediol, ethanediol, and butanediol, among others known in the art). The CO₂ (produced by reaction of the organic diol and the first cyclic alkylene carbonate in preparing a polyester resin) can be reacted with an alkylene glycol or an alkylene oxide in a second reaction mixture, thereby producing a second cyclic alkylene carbonate. The second cyclic alkylene carbonate can be added to the first cyclic alkylene carbonate and/or the first reaction mixture, in some embodiments. The first cyclic alkylene carbonate and the second alkylene carbonate can have the same chemical structure, in certain embodiments.

In some embodiments, the polyester resin (e.g., unsaturated polyester resin) can comprise one or more of poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co ethoxylated bisphenol co-itaconate), and poly(1,2-propylene itaconate), among others known in the art. In certain embodiments, the polyester resin (e.g., saturated polyester resin) can comprise one or more of poly(ethoxylated bisphenol co-succinate), poly(ethoxylated bisphenol co-terephthalate), or poly (ethoxylated bisphenol co-isophthalate), among others known in the art. In certain embodiments, the polyester resin (e.g., unsaturated polyester resin) can comprise at least one of poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), and poly(1,2-propylene fumarate). The polyester resin can comprise poly(propoxylated bisphenol co-fumarate), poly(ethoxylated bisphenol co-fumarate), or poly(butyloxylated bisphenol co-fumarate), in some embodiments. The polyester can comprise poly(propoxylated bisphenol co-fumarate), in certain embodiments. In some embodiments, the polyester resin can have a Mn range of between about 2,000 g/mole and about 50,000 g/mole or between about 4,000 g/mole and about 40,000 g/mole. In certain embodiments, the polyester resin can have a Mw range between about 5,000 g/mole and about 200,000 g/mole, between about 5,000 g/mole and about 100,000 g/mole, or between about 25,000 g/mole and about 100,000 g/mole. The polyester resin can have a glass transition temperature between about 40° C. and about 90° C., between about 45° C. and about 85° C., or between about 50° C. and about 65° C., in some embodiments.

As discussed above, in embodiments a polyester resin can be prepared by a process comprising reacting an organic diol and a first cyclic alkylene carbonate. The organic diol can comprise ethane diol, 1,2-propanediol, 1,3-propanediol, 1,3-butanediol, 1,2-butanediol, 1,4-butanediol, pentylene glycol, hexylene glycol, diphenol, neopentyl glycol, diethylene glycol, dipropylene glycol, 2,2-bis-(4-hydroxy phenyl)propane, 2,2-bis-(3-hydroxy phenyl)propane, 2,2-bis-(2-hydroxy phenyl)propane, 2,2-bis-(3-hydroxy phenyl)propane, 2,2-bis-(5-hydroxy phenyl)propane, bisphenol A, ethoxylated bisphenol A, propoxylated bisphenol A, bis-(4-hydroxy phenyl)methane, 1,1-bis-(4-hydroxy phenyl)ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, or a mixture of two or more thereof, among others known in the art. In some embodiments, the organic diol can comprise bisphenol A, ethoxylated bisphenol A, or propoxylated bisphenol A. The organic diol can comprise bisphenol A, in certain embodiments. In some embodiments, the organic diol can be obtained from a plant or an animal source. The amount of organic diol selected can vary, and can be present in the first reaction mixture, for example, in an amount from about 40 mole percent to about 60 mole percent of the resin, about 42 mole percent to about 55 mole percent of the resin, or about 45 percent to about 53 mole percent of the resin.

In embodiments, the first cyclic alkylene carbonate reacted with the organic diol as a part of producing the polyester resin (e.g., saturated or unsaturated) can have from about 3 to about 25 carbon atoms; about 3 to about 10 carbon atoms; or about 3 to about 5 carbon atoms. In some embodiments, the first cyclic alkylene carbonate can comprise ethylene carbonate, 1,2-propylene carbonate, or 1,2-butylene carbonate. In some embodiments, the first cyclic alkylene carbonate can be present in the first reaction mixture, for example, in an amount from about 1.95 mole equivalents to about 2.40 mole equivalents, about 1.95 mole equivalents to about 2.2 mole equivalents, or about 1.95 mole equivalents to about 2.0 mole equivalents, based on about 1 mole equivalent of organic diol utilized.

The first reaction mixture (used to prepare a polyalkoxy diol by reacting an organic diol with a first cyclic alkylene carbonate, can further comprise a first catalyst to catalyze the reaction of the organic diol and the first cyclic alkylene carbonate. The first catalyst can comprise an alkali carbonate. In embodiments, the first catalyst can comprise sodium carbonate, lithium carbonate, potassium carbonate, sodium carbonate, rubidium carbonate, cesium carbonate, beryllium carbonate, magnesium carbonate, calcium carbonate, strontium carbonate, beryllium carbonate, manganese carbonate, barium carbonate, or a mixture of two or more thereof, among others known in the art. In some embodiments, the first catalyst can comprises potassium carbonate. In embodiments, first catalyst in the first reaction mixture can be present in an amount of from about 0.001 to about 0.1 mole equivalents or about 0.001 to about 0.01 mole equivalents, based on about 1 mole equivalent of organic diol utilized.

In embodiments, carbon dioxide ($CO_2$) can be produced as the organic diol is reacted with the first cyclic alkylene carbonate to produce a polyalkoxy diol. The carbon dioxide can be reacted with an alkylene glycol or alkylene oxide in a second reaction mixture, thereby producing a second cyclic alkylene carbonate. In embodiments, the alkylene glycol or alkylene oxide can have from about 2 to about 24 carbon atoms; about 2 to about 10 carbon atoms; or about 2 to about 4 carbon atoms. In some embodiments the alkylene glycol can comprise ethylene glycol, propylene glycol, or glycerin, among other alkylene glycols known in the art. In some embodiments, carbon dioxide can be collected from two or more batch reactions of a first reaction mixture, to provide a larger amount of carbon dioxide, until the second reaction mixture can be reacted to reach a high conversion (>80%) of the carbon dioxide to second cyclic alkylene carbonate. After conversion, the second cyclic alkylene carbonate can be added to the first cyclic alkylene carbonate and/or the first reaction mixture.

The second reaction mixture used to prepare the second cyclic alkylene carbonate and comprising $CO_2$ and the alkylene glycol can further comprise a second catalyst. In embodiments, the second catalyst can comprise an alkali carbonate. In some embodiments, the second catalyst can comprise sodium carbonate, potassium carbonate, cesium carbonate, ammonium carbonate, or a mixture of two or more thereof. The second reaction mixture used to prepare the second cyclic alkylene carbonate and comprising $CO_2$ and the alkylene oxide can further comprise a second catalyst. In certain embodiments, the second catalyst can comprise a pretreated strong basic anionic exchanger resin (such as, DOWEX® MSA1, Dow Chemical Co.). In some embodiments, the second catalyst can comprise a transition metal salt of the iron triad (e.g., $CoCl_2$, $FeCl_3$ and $NiCl_2$) or a Group 2 metal halide (e.g., $CaCl_2$, $MgBr_2$, $ZnCl_2$, $CaI_2$, and $SnCl_2$).

In embodiments, the second cyclic alkylene carbonate (produced from the $CO_2$-byproduct) can be added to the first alkylene carbonate and/or the first reaction mixture. In some embodiments the first cyclic alkylene carbonate and the second cyclic alkylene carbonate can have the same chemical structure.

In some embodiments, the polyalkoxy diol (prepared by reacting the organic diol and the first cyclic alkylene carbonate) can, optionally, be reacted with an organic diacid or diester through polycondensation to produce a polyester. In some embodiments, the polyalkoxy diol can be reacted with the organic diacid or diester in the presence of a polycondensation catalyst.

Examples of diacids or diesters including vinyl diacids or vinyl diesters that can be utilized for the preparation of polyester resins (such as, unsaturated polyester resins) include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. In some embodiments, the organic diacid or diester can be obtained from a plant or an animal source. In some embodiments, the organic diacid or diester can be present, for example, in an amount from about 40 to about 60 mole percent of the resin, about 42 to about 52 mole percent of the resin, about 45 to about 50 mole percent of the resin.

Processes for Preparing a Toner Composition

The polyester (unsaturated and saturated) resins prepared by methods as described above can be used to form toner compositions. Such toner compositions can include optional colorants, waxes, and other additives. Toners can be formed using any method within the purview of those skilled in the art.

Certain embodiments are drawn to a process for preparing a toner composition comprising: preparing a saturated polyester resin or an unsaturated polyester resin, as described above, including reacting the polyalkoxy diol with an organic diacid or diester, and contacting the polyester resin with at least one toner production component. Thus, some embodiments can comprise: reacting an organic diol and a first cyclic alkylene carbonate in a first reaction mixture, thereby producing carbon dioxide ($CO_2$) and a polyalkoxy diol; reacting the $CO_2$ with an alkylene glycol or alkylene oxide in a second reaction mixture, thereby producing a second cyclic alkylene carbonate; adding the second cyclic alkylene carbonate to the first cyclic alkylene carbonate and/or the first reaction mixture; reacting the polyalkoxy diol with an organic diacid or diester to produce a saturated polyester resin or an unsaturated polyester resin; and contacting the polyester resin produced with at least one toner production component. In embodiments, the toner composition can comprise between about 70% and about 99%, between about 80% and about 95%, or between about 85% and about 95% by weight the polyester resin. The remainder of the toner composition can comprise wax, colorants, charge control agents, and/or flow additives, among other toner production components known in the art.

In certain embodiments, the polyester resin can be contacted with at least two toner production components and the polyester resin can be contacted with different toner production components at different times. A toner composition produced by some embodiments can comprise at least one polyester, wherein the at least one polyester is crosslinked or uncrosslinked, and optionally, at least one colorant and/or wax component. The toner composition can comprise a saturated polyester in some embodiments.

The toner particles can be prepared by any method within the purview of one skilled in the art, including extrusion with subsequent jetting to form toner particles, or chemical processes, such as microsuspension, encapsulation processes, or emulsion and aggregation/coalescence processes. In certain embodiments, toner compositions and toner particles can be prepared by aggregation and coalescence processes in which small-size resin particles are aggregated to the appropriate toner particle size and then coalesced to achieve the final toner particle shape and morphology.

In embodiments, the colorants, waxes, and other toner production components utilized to form toner compositions can be in dispersions including surfactants. Moreover, toner particles can be formed by emulsion aggregation methods where the resin and other components of the toner composition are comprised of emulsion particles, pigment particles, wax particles, surfactants and aggregating agents, which are aggregated, coalesced, optionally washed and dried, and recovered.

One, two, or more surfactants can be utilized. The surfactants can be selected from ionic surfactants and nonionic surfactants. Anionic surfactants and cationic surfactants are encompassed by the term "ionic surfactants." In embodiments, the surfactant can be utilized so that it is present in an amount of from about 0.01% to about 5% by weight of the toner composition, for example from about 0.75% to about 4% by weight of the toner composition, in embodiments from about 1% to about 3% by weight of the toner composition.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which can be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants can be utilized in embodiments.

Examples of the cationic surfactants, which are positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

As a colorant, various known suitable colorants, such as dyes, pigments, mixtures of dyes, mixtures of pigments, mixtures of dyes and pigments, and the like, can be included in the toner. The colorant can be included in the toner composition in an amount of, for example, about 0.1 to about 35 percent by weight of the toner, or from about 1 to about 15 weight percent of the toner, or from about 3 to about 10 percent by weight of the toner.

Examples of suitable colorants, include carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Cyan, magenta, or yellow pigments or dyes, or mixtures thereof, can be used, in some embodiments. The pigment or pigments can be used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Colorants that can be selected include black, cyan, magenta, or yellow, or mixtures thereof. Examples of magentas are 2,9-dimethyl-substituted quinacridone and anthraquinone dye identified in the Color Index as CI-60710, CI Dispersed Red 15, diazo dye identified in the Color Index as CI-26050, CI Solvent Red 19, and the like. Illustrative examples of cyans include copper tetra(octadecyl sulfonamido) phthalocyanine, x-copper phthalocyanine pigment listed in the Color Index as CI-74160, CI Pigment Blue, Pigment Blue 15:3, and Anthrathrene Blue, identified in the Color Index as CI-69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components can also be selected as colorants.

Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

A wax can also be combined with the resin and optional colorant in forming toner particles, in some embodiments. When included, the wax can be present in an amount of, for example, from about 1 weight percent to about 25 weight percent of the toner particles, in embodiments from about 5 weight percent to about 20 weight percent of the toner particles.

Waxes that can be selected include waxes having, for example, a weight average molecular weight of from about 500 to about 20,000, in embodiments from about 1,000 to about 10,000. Waxes that can be used include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-

P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that can be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes can also be used in embodiments. Waxes can be included as, for example, fuser roll release agents.

A polyester resin (e.g., unsaturated polyester resin) that can be used to prepare a toner composition in some embodiments can comprise poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate), poly(propoxylated bisphenol co-itaconate), poly (ethoxylated bisphenol co-itaconate), poly(butyloxylated bisphenol co-itaconate), poly(co-propoxylated bisphenol co-ethoxylated bisphenol co-itaconate), or poly(1,2-propylene itaconate), among others known in the art.

In some embodiments, the polyester resin can be a crosslinkable resin. A crosslinkable resin is a resin including a crosslinkable group or groups such as a C=C bond. The resin can be crosslinked, for example, through a free radical polymerization with an initiator. Thus, in embodiments, a resin can be partially crosslinked, which can be referred to, in embodiments, as a "polyester gel". In embodiments, from about 1% by weight to about 50% by weight of the polyester gel can be crosslinked, in embodiments from about 5% by weight to about 35% by weight of the polyester gel can be crosslinked.

In embodiments, the unsaturated polyester resins described above can be partially crosslinked. Methods for forming the polyester gel include those within the purview of those skilled in the art. For example, crosslinking can be achieved by combining an unsaturated polyester resin with a crosslinker, sometimes referred to herein, in embodiments, as an initiator.

Examples of suitable crosslinkers include, but are not limited to, for example, free radical or thermal initiators such as organic peroxides and azo compounds. Examples of suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di (2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di (t-butyl peroxy) hexane, t-butyl cumyl peroxide, .alpha.-.alpha.-bis(t-butyl peroxy)diisopropyl benzene, di-t-butyl peroxide and 2,5-dimethyl 2,5-di (t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di (t-butyl peroxy) valerate, 1,1-di (t-butyl peroxy) 3,3,5-trimethyl cyclohexane, 1,1-di (t-butyl peroxy)cyclohexane, 1,1-di (t-amyl peroxy)cyclohexane, 2,2-di (t-butyl peroxy) butane, ethyl 3,3-di (t-butyl peroxy) butyrate and ethyl 3,3-di (t-amyl peroxy) butyrate, and combinations thereof. Examples of suitable azo compounds include 2,2,'-azobis(2,4-dimethyl-pentane nitrile), azobis-isobutyronitrile, 2,2'-azobis (isobutyronitrile), 2,2'-azobis (2,4-dimethyl valeronitrile), 2,2'-azobis (methyl butyronitrile), 1,1'-azobis (cyano cyclohexane), other similar known compounds, and combinations thereof.

Although any suitable initiator can be used, in embodiments the initiator can be an organic initiator that is soluble in any solvent present, but not soluble in water. For example, half-life/temperature characteristic plots for VAZO®52 (2,2,'-azobis(2,4-dimethylpentane nitrile), commercially available from E. I. du Pont de Nemours and Company, USA) shows a half-life greater than about 90 minutes at about 65° C. and less than about 20 minutes at about 80° C.

Where utilized, the initiator can be present in an amount of from about 0.5% by weight to about 20% by weight of the resin, in embodiments from about 1% by weight to about 10% by weight of the resin.

One, two, or more resins can be used. In embodiments where two or more resins are used (for example, including an unsaturated polyester resin), the resins can be in any suitable ratio (e.g., weight ratio) such as for instance about 10% (unsaturated polyester resin)/90% (second resin) to about 90% (unsaturated polyester resin)/10% (second resin). In embodiments, the resin can be formed by emulsion polymerization methods.

Certain embodiments for producing a toner composition can include preparing a polyester resin using an organic diol as a reactant. The organic diol can comprise ethane diol, 1,2-propanediol, 1,3-propanediol, 1,3-butanediol, pentylene glycol, hexylene glycol, diphenol, neopentyl glycol, diethylene glycol, dipropylene glycol, 2,2-bis-(4-hydroxy phenyl) propane, 2,2-bis-(3-hydroxy phenyl)propane, 2,2-bis-(2-hydroxy phenyl)propane, 2,2-bis-(3-hydroxy phenyl)propane, 2,2-bis-(5-hydroxy phenyl)propane, bisphenol A, ethoxylated bisphenol A, propoxylated bisphenol A, bis-(4 hydroxy phenyl)methane, 1,1-bis-(4-hydroxy phenyl)ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, or a mixture of two or more thereof, among others known in the art. In some embodiments, the organic diol can comprise bisphenol A, ethoxylated bisphenol A, or propoxylated bisphenol A. The organic diol can comprise bisphenol A, in certain embodiments. In some embodiments, the organic diol can be obtained from a plant or an animal source. The amount of organic diol selected can vary, and can be present in the first reaction mixture, for example, in an amount from about 40 mole percent to about 60 mole percent of the resin, about 42 mole percent to about 55 mole percent of the resin, or about 45 percent to about 53 mole percent of the resin.

In some embodiments for producing a toner, a first cyclic alkylene carbonate can be reacted with the organic diol in producing a saturated polyester resin or an unsaturated polyester resin and the first alkylene carbonate can have from about 3 to about 25 carbon atoms; about 3 to about 10 carbon atoms; or about 3 to 5 carbon atoms. In some embodiments, the first cyclic alkylene carbonate can comprise ethylene carbonate, 1,2-propylene carbonate, or 1,2-butylene carbonate. In certain embodiments, the first cyclic alkylene carbonate can be present in the first reaction mixture, for example, in an amount from about 1.95 mole equivalents to about 2.40 mole equivalents, about 1.95 mole equivalents to about 2.2 mole equivalents, or about 1.95 mole equivalents to about 2.0 mole equivalents, based on about 1 mole equivalent of organic diol utilized.

In embodiments a polyester resin can be prepared by a method comprising reacting a polyalkoxy diol and an organic diacid or diester to produce the polyester resin. Examples of diacids including vinyl diacids that can be utilized for the preparation of polyester resins include dicarboxylic acids such as terephthalic acid, phthalic acid, isophthalic acid, fumaric acid, maleic acid, succinic acid, itaconic acid, dodecylsuccinic acid, glutaric acid, adipic acid, pimelic acid, suberic acid, azelaic acid, dodecane diacid, and combinations thereof. In some embodiments, the organic diacid or diester can be obtained from a plant or an animal source. In some embodiments, the organic diacid or diester can be present, for example, in an amount from about 40 to about 60 mole percent of the resin, about 42 to about 52 mole percent of the resin, about 45 to about 50 mole percent of the resin.

In certain embodiments, an alkylene glycol or alkylene oxide can be reacted with carbon dioxide byproduct (from reaction of a diol with a first cyclic alkylene carbonate) to produce a second cyclic alkylene carbonate. In embodiments, the alkylene glycol or alkylene oxide can have from about 2 to about 24 carbon atoms; about 2 to about 10 carbon atoms; or about 2 to about 4 carbon atoms. In some embodiments, the alkylene glycol can be ethylene glycol, propylene glycol, or glycerin, among others known in the art.

The first reaction mixture (used to prepare a polyalkoxy diol by reacting an organic diol with a first cyclic alkylene carbonate) can further comprise a first catalyst, as described above. The second reaction mixture (used to prepare the second cyclic alkylene carbonate and comprising $CO_2$ and the alkylene glycol/alkylene oxide) can further comprise a second catalyst, as described above.

In embodiments, the second cyclic alkylene carbonate (produced from the $CO_2$-byproduct) can be added to the first alkylene carbonate and/or the first reaction mixture. In some embodiments the first cyclic alkylene carbonate and the second cyclic alkylene carbonate can have the same chemical structure.

The polyalkoxy diol (prepared by reacting the organic diol and the first cyclic alkylene carbonate) can, optionally, be reacted with an organic diacid or a diester through polycondensation to produce a polyester. In some embodiments, the polyalkoxy diol can be reacted with the organic diacid in the presence of a polycondensation catalyst. Polycondensation catalysts known in the art can be used in some embodiments. In certain embodiments, the polycondensation catalyst can be a tetraalkyl titanate, a dialkyltin oxide (such as dibutyltin oxide), a tetraalkyltin (such as dibutyltin dilaurate), and a dialkyltin oxide hydroxide (such as butyltin oxide hydroxide), an aluminum alkoxide, an alkyl zinc, a dialkyl zinc, a zinc oxide, a stannous oxide, or combinations thereof. Such catalysts can be utilized in amounts of, for example, from about 0.01 mole percent to about 5 mole percent based on the starting diacid or diester used to generate the polyester resin.

In embodiments the carbon dioxide generated derived from a cyclic alkylene carbonate during the manufacturing process of resins (e.g., unsaturated polyester resins or saturated polyester resins) used in toners can be re-directed into a reaction vessel where it can be reacted with an alkylene glycol or alkylene oxide to regenerate alkylene carbonate. The alkylene glycol (such as, ethylene glycol or propylene glycol or glycerin) or alkylene oxide can be less expensive than the processed alkylene carbonate commercially available. The carbon dioxide can thus be recycled. The alkylene carbonate can be easily prepared from alkylene glycol/alkylene oxide and carbon dioxide with a catalyst, as described above.

Below is a reaction scheme (I) for preparing an unsaturated resin that can be used in a toner composition in some embodiments.

R = H, CH₃, CH₂OH

In reaction scheme (I), an organic diol, bisphenol A, can be reacted with a cyclic alkylene carbonate (ethylene carbonate, propylene carbonate, or glycerin carbonate), thereby producing carbon dioxide and a polyalkoxy diol (2,2'-[2,2-propanediylbis(4,1-phenylene oxy)]diethanol, 1,1'-[2,2-propanediylbis(4,1-phenyleneoxy)]dipropanol, or 3,3'-[2,2-propanediylbis(4,1-phenyleneoxy)]di-(1,2-propanediol)). Subsequently, the polyalkoxy diol can be reacted with an organic diacid or diester to produce a polyester resin.

The carbon dioxide generated from the cyclic alkylene carbonate during the production of the polyester resin can be re-directed into a reaction vessel wherein it is reacted with an alkylene glycol (or alkylene oxide) to regenerate the cyclic alkylene carbonate. For example reaction scheme (II) depicts one reaction to prepare a cyclic alkylene carbonate of certain embodiments.

In reaction scheme (II), an alkylene glycol, such as ethylene glycol, propylene glycol, or glycerin (which are less expensive than the alkylene carbonate), is reacted with the carbon dioxide byproduct, thereby recycling the carbon dioxide. For example, a cyclic alkylene carbonate can be prepared by reacting propylene glycol and carbon dioxide in the presence of a catalyst (such as, an alkali carbonate). Furthermore, certain alkylene glycols (such as, 1,2-propylene glycol) can be made from plant or animal (bio-based) materials or glycerin.

Some embodiments can be continuous loop processes, where $CO_2$ generated from polyester synthesis can be fed into a secondary reactor to react with an alkylene glycol or alkylene oxide in the presence of a catalyst to regenerate alkylene carbonate for use in the polyester synthesis. The alkylene carbonate regenerated from the carbon dioxide can be distilled before addition to the polyester synthesis in some embodiments. Differences in reaction conditions between the reactor(s) used for the polyester synthesis and the reactor for alkylene carbonate production can be controlled by first trapping the $CO_2$ byproduct and/or pressure regulating it before introduction into a second reactor for alkylene carbonate production.

The toners prepared in embodiments can be utilized for electrostatographic or xerographic processes. In embodiments, any known type of image development system can be used in an image developing device, including, for example, magnetic brush development, jumping single-component development, hybrid scavengeless development (HSD), and the like. These and similar development systems are within the purview of those skilled in the art.

Imaging processes include, for example, preparing an image with a xerographic device including a charging component, an imaging component, a photoconductive component, a developing component, a transfer component, and a fusing component. In embodiments, the development component can include a developer prepared by mixing a carrier with a toner composition described herein. The xerographic device can include a high speed printer, a black and white high speed printer, a color printer, and the like.

Once the image can be formed with toners/developers via a suitable image development method such as any one of the aforementioned methods, the image can then be transferred to an image receiving medium such as paper and the like. In embodiments, the toners can be used in developing an image in an image-developing device utilizing a fuser roll member. Fuser roll members are contact fusing devices that are within the purview of those skilled in the art, in which heat and pressure from the roll can be used to fuse the toner to the image-receiving medium. In embodiments, the fuser member can be heated to a temperature above the fusing temperature of the toner, for example to temperatures of from about 70° C. to about 160° C., in embodiments from about 80° C. to about 150° C., in other embodiments from about 90° C. to about 140° C., after or during melting onto the image receiving substrate.

In embodiments where the resin is crosslinkable, such crosslinking can be accomplished in any suitable manner. For example, the resin can be crosslinked during fusing of the toner to the substrate where the resin is crosslinkable at the fusing temperature. Crosslinking also can be affected by heating the fused image to a temperature at which the toner will be crosslinked, for example in a post-fusing operation. In embodiments, crosslinking can be effected at temperatures of from about 160° C. or less, in embodiments from about 70° C. to about 160° C., in other embodiments from about 80° C. to about 140° C.

Processes for Recycling Carbon Dioxide

Certain embodiments are drawn to processes for recycling carbon dioxide. The processes comprise reacting an organic diol and a first cyclic alkylene carbonate in a first reaction mixture, as described above, thereby producing carbon dioxide ($CO_2$) and a polyalkoxy diol. As discussed above the $CO_2$ can be reacted with an alkylene glycol or alkylene oxide in a second reaction mixture, thereby producing a second cyclic alkylene carbonate; and the second cyclic alkylene carbonate can be added to the first cyclic alkylene carbonate and/or the first reaction mixture to recycle the carbon dioxide. The first cyclic alkylene carbonate and the second alkylene carbonate can have the same chemical structure, in certain embodiments.

The following Examples further define and describe embodiments herein. Unless otherwise indicated, all parts and percentages are by weight.

EXAMPLES

Example 1

Figure 1:
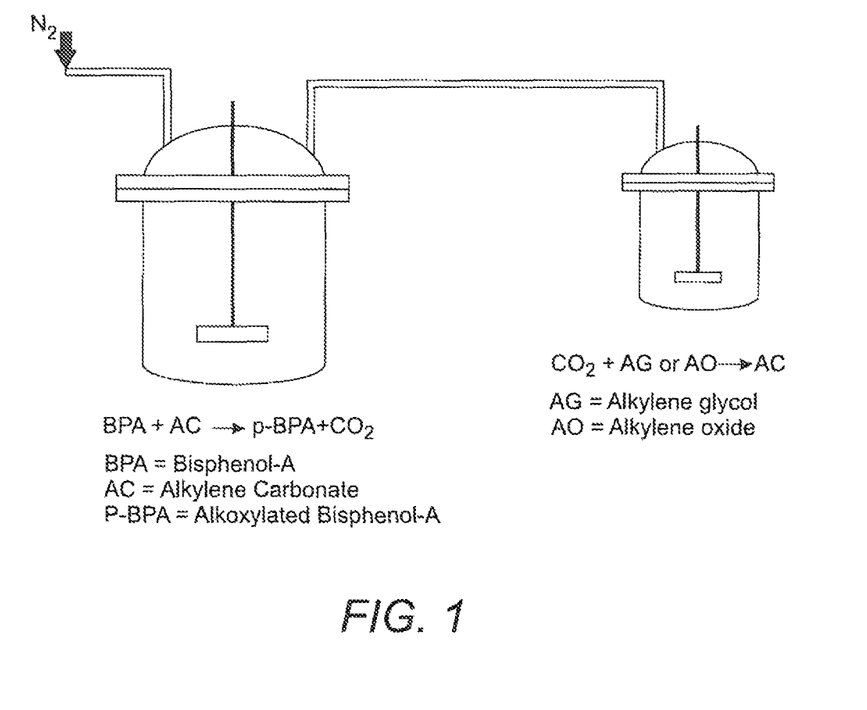
FIG. 1 is an illustration of production of a polyalkoxy diol and production of a cyclic alkylene carbonate using carbon dioxide resulting from production of the polyalkoxy diol.

A continuous reactor series loop comprised of a 2-Liter Buchi reactor equipped with a distillation apparatus and connected to a 1-Liter Parr reactor equipped with a magnetic stirrer was configured as shown in FIG. 1.

The primary 2-L reactor was charged with 540 grams of propylene carbonate, 588 grams of bisphenol A, and 1.2 grams of potassium carbonate. The mixture was heated to 185° C., and maintained for 6 hours. Into the second 1 Liter vessel, was added 570 grams of propylene glycol, 50 grams of acetonitrile, 2.5 grams of 1,2,7-triazabicyclo[4.4.0]dec-5-ene, and 3.3 grams of ammonium carbonate and the mixture was heated to 175° C. with stirring. The continuous reactor system was purged with nitrogen, and a pressure was allowed to build for the combined loop to about 1.5 MPa, at which time, the nitrogen pressure was regulated such to maintain the pressure at 1.5 to 1.6 MPa. After about 6 hours, the reaction was stopped, and the NMR showed that the propylene carbonate from the 2-L reactor was depleted, whereas the propylene carbonate product resulting from the carbon dioxide being reacted achieved about a 44% conversion.

Distillation of the propylene carbonate can easily be performed using methods known in the art and recycled back into the primary reactor.

Example 2

Figure 2:
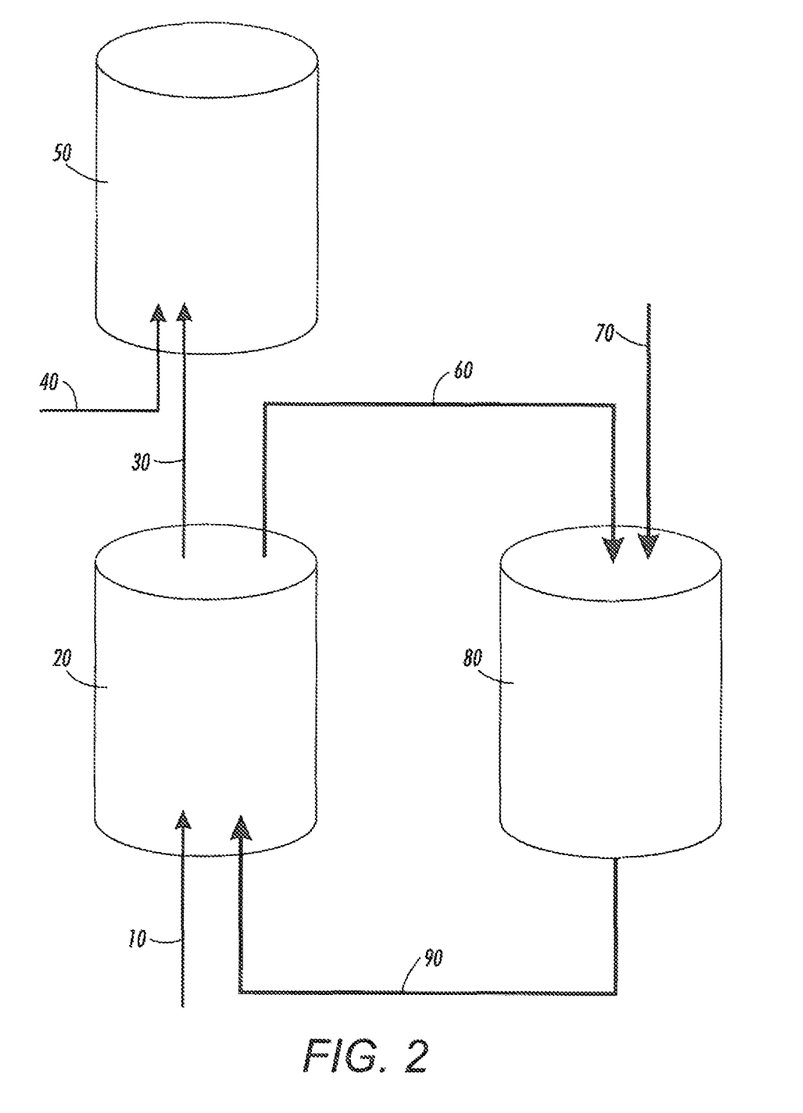
FIG. 2 is an illustration of an embodiment comprising recycling a carbon dioxide byproduct of a polyester resin production process.

FIG. 2 depicts an example of certain embodiments. Reaction components 10 including a first cyclic alkylene carbonate and an organic diol are provided to a first reactor 20 for production of a polyester resin. The byproduct, carbon dioxide 60, results from reaction of the first cyclic alkylene carbonate and the organic diol in the first reactor 20 and is released and removed to a second reactor 80. Alkylene glycol/alkylene oxide 70 is added to the second reactor 80. The carbon dioxide and alkylene glycol/alkylene oxide are reacted in the second reactor 80 to produce a second cyclic alkylene carbonate 90, which is supplied to the first reactor 20. Catalysts and other components can be added to either the first reactor 20 or the second reactor 80 or both.

The reaction of the first cyclic alkylene carbonate and the organic diol in the first reactor results in production of a polyalkoxy diol in addition to the carbon dioxide. The polyalkoxy diol is used to prepare a polyester resin, and preparation of the polyester can be performed in the first reactor 20 or in one or more additional reactors (not shown). Polyester resin 30 is supplied to a third reactor 50, along with one or more additional toner production components 40 for production of a toner.

Example 3

Figure 3:
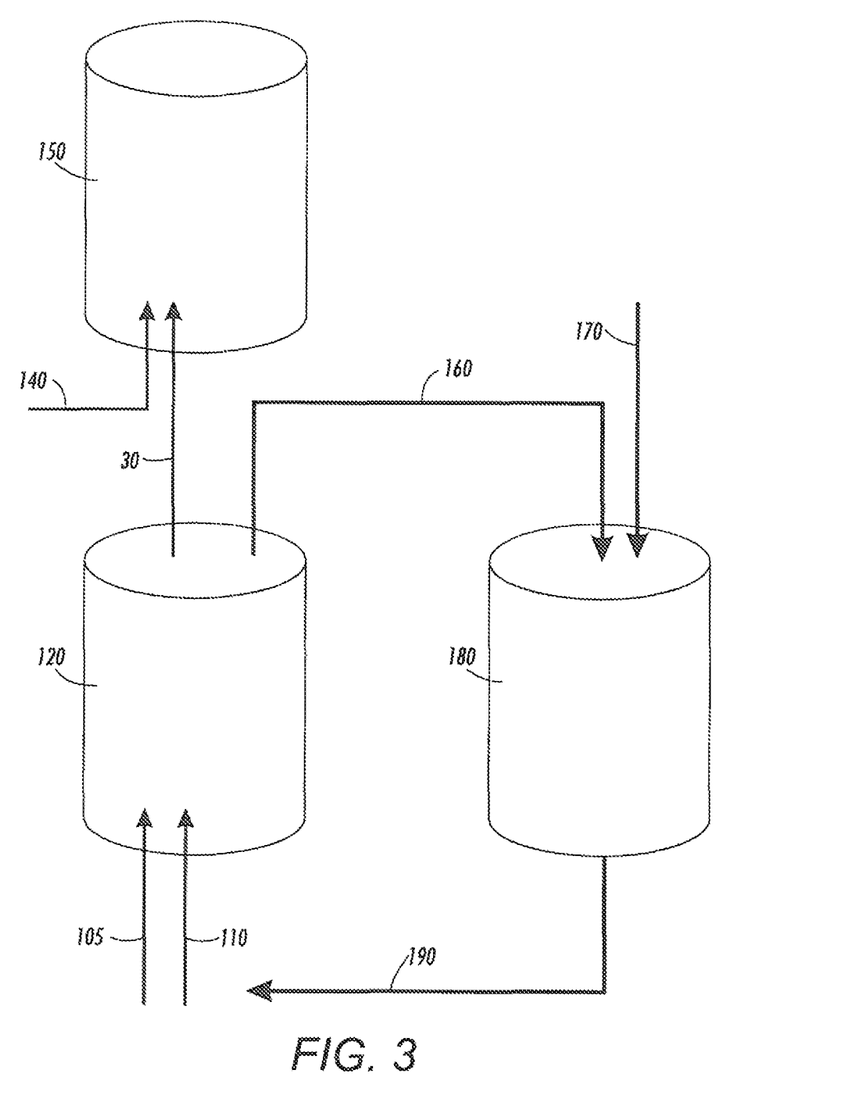
FIG. 3 is an illustration of an embodiment comprising recycling a carbon dioxide byproduct of a polyester resin production process.

FIG. 3 depicts an example of certain embodiments. Reaction components 105, including an organic diol, and a first cyclic alkylene carbonate 110 are provided to a first reactor 120 for production of a polyester resin. The byproduct, carbon dioxide 160, results from reaction of the first cyclic alkylene carbonate and the organic diol in the first reactor 120 and is released and removed to a second reactor 180. Alkylene glycol/alkylene oxide 170 is added to the second reactor 180. The carbon dioxide and alkylene glycol/alkylene oxide are reacted in the second reactor 180 to produce a second cyclic alkylene carbonate 190, which is supplied to the first cyclic alkylene carbonate 110. Catalysts and other components can be added to either the first reactor 120 or the second reactor 180 or both.

The reaction of the first cyclic alkylene carbonate and the organic diol in the first reactor results in production of a polyalkoxy diol in addition to the carbon dioxide. The polyalkoxy diol is used to prepare a polyester resin, and preparation of the polyester can be performed in the first reactor 120 or in one or more additional reactors (not shown). Polyester resin 130 is supplied to a third reactor 150, along with one or more additional toner production components 140 for production of a toner.

It will be appreciated that variants of the above-disclosed and other features and functions, or alternatives thereof, may be combined into many other different systems or applications. Various presently unforeseen or unanticipated alternative, modifications, variations or improvements therein may be subsequently made by those skilled in the art which are also intended to be encompassed by the following claims.

To the extent that the terms "containing," "including," "includes," "having," "has," "with," or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g., −1, −1.2, −1.89, −2, −2.5, −3, −10, −20, and −30, etc.

Further, in the discussion and claims herein, the term "about" indicates that the values listed may be somewhat altered, as long as the alteration does not result in nonconformance of the process or structure to the illustrated embodiment. Finally, "exemplary" indicates the description is used as an example, rather than implying that it is an ideal.

What is claimed is:

1. A process for preparing a polyester resin as a toner production component comprising:
    reacting an organic diol and a first cyclic alkylene carbonate in a first reaction mixture, thereby producing carbon dioxide ($CO_2$) and a polyalkoxy diol,
    reacting the $CO_2$ with an alkylene glycol or alkylene oxide in a second reaction mixture, thereby producing a second cyclic alkylene carbonate, and
    adding the second cyclic alkylene carbonate to the first cyclic alkylene carbonate and/or the first reaction mixture, wherein the first cyclic alkylene carbonate and the second alkylene carbonate have the same chemical structure.

2. The process of claim 1, wherein the polyester resin comprises one or more of poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co ethoxylated bisphenol co-itaconate), and poly(1,2-propylene itaconate).

3. The process of claim 1, wherein the organic diol comprises ethane diol, 1,2-propanediol, 1,3-propanediol, 1,3-butanediol, pentylene glycol, hexylene glycol, diphenol, neopentyl glycol, diethylene glycol, dipropylene glycol, 2,2-bis-(4-hydroxy phenyl)propane, 2,2-bis-(3-hydroxy phenyl)propane, 2,2-bis-(2-hydroxy phenyl)propane, 2,2-bis-(3-hydroxy phenyl)propane, 2,2-bis-(5-hydroxy phenyl)propane, bisphenol A, ethoxylated bisphenol A, propoxylated bisphenol A, bis-(4-hydroxy phenyl)methane, 1,1-bis-(4-hydroxy phenyl)ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, or a mixture of two or more thereof.

4. The process of claim 1, wherein the organic diol comprises bisphenol A.

5. The process of claim 1, wherein the first cyclic alkylene carbonate comprises from about 3 to about 25 carbon atoms.

6. The process of claim 1, wherein the first cyclic alkylene carbonate comprises ethylene carbonate, 1,2-propylene carbonate, or 1,2-butylene carbonate.

7. The process of claim 1, wherein the alkylene glycol or alkylene oxide comprises from about 2 to about 24 carbon atoms.

8. The process of claim 1, wherein the alkylene glycol comprises ethylene glycol, propylene glycol, or glycerin.

9. The process of claim 1, wherein the first reaction mixture comprises a first catalyst.

10. The process of claim 1, wherein the second reaction mixture comprises a second catalyst.

11. The process of claim 1, further comprising reacting the polyalkoxy diol with an organic diacid or diester.

12. A process for preparing a toner composition comprising:
   preparing a polyester resin by a method comprising:
      reacting an organic diol and a first cyclic alkylene carbonate in a first reaction mixture, thereby producing carbon dioxide ($CO_2$) and a polyalkoxy diol,
      reacting the $CO_2$ with an alkylene glycol or alkylene oxide in a second reaction mixture, thereby producing a second cyclic alkylene carbonate,
      adding the second cyclic alkylene carbonate to the first cyclic alkylene carbonate and/or the first reaction mixture, wherein the first cyclic alkylene carbonate and the second alkylene carbonate have the same chemical structure, and
      reacting the polyalkoxy diol with an organic diacid or diester, and
   contacting the polyester resin with at least one toner production component.

13. The process of claim 12, wherein the toner production component is a colorant or a wax.

14. The process of claim 13, wherein the polyester resin is contacted with at least two toner production components and the polyester resin is contacted with different toner production components at different times.

15. The process of claim 12, wherein the toner composition comprises at least one crosslinked polyester.

16. The process of claim 12, wherein the polyester resin comprises one or more of poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co ethoxylated bisphenol co-itaconate), and poly(1,2-propylene itaconate).

17. The process of claim 12, wherein the organic diol comprises ethane diol, 1,2-propanediol, 1,3-propanediol, 1,3-butanediol, pentylene glycol, hexylene glycol, diphenol, neopentyl glycol, diethylene glycol, dipropylene glycol, 2,2-bis-(4-hydroxy phenyl)propane, 2,2-bis-(3-hydroxy phenyl)propane, 2,2-bis-(2-hydroxy phenyl)propane, 2,2-bis-(3-hydroxy phenyl)propane, 2,2-bis-(5-hydroxy phenyl)propane, bisphenol A, ethoxylated bisphenol A, propoxylated bisphenol A, bis-(4-hydroxy phenyl)methane, 1,1-bis-(4-hydroxy phenyl)ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, or a mixture of two or more thereof.

18. The process of claim 12, wherein the first cyclic alkylene carbonate comprises ethylene carbonate, 1,2-propylene carbonate, or 1,2-butylene carbonate.

19. The process of claim 12, wherein the alkylene glycol comprises ethylene glycol, propylene glycol, or glycerin.

20. A process for recycling carbon dioxide (CO2) comprising:
   reacting an organic diol and a first cyclic alkylene carbonate in a first reaction mixture, thereby producing carbon dioxide ($CO_2$) and a polyalkoxy diol,
   reacting the $CO_2$ with an alkylene glycol or alkylene oxide in a second reaction mixture, thereby producing a second cyclic alkylene carbonate, and
   adding the second cyclic alkylene carbonate to the first cyclic alkylene carbonate and/or the first reaction mixture, wherein the first cyclic alkylene carbonate and the second alkylene carbonate have the same chemical structure.

* * * * *